(12) United States Patent
Donahue et al.

(10) Patent No.: US 9,294,608 B2
(45) Date of Patent: Mar. 22, 2016

(54) CONTEXTUAL AUTO-REPLICATION IN SHORT RANGE WIRELESS NETWORKS

(75) Inventors: Joseph J. Donahue, Woodinville, WA (US); Darrell L. Blegen, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1958 days.

(21) Appl. No.: 11/676,647

(22) Filed: Feb. 20, 2007

(65) Prior Publication Data

US 2008/0200207 A1 Aug. 21, 2008

(51) Int. Cl.
H04M 3/00 (2006.01)
H04M 1/725 (2006.01)
H04W 88/04 (2009.01)
H04L 29/08 (2006.01)

(52) U.S. Cl.
CPC ............. *H04M 1/7253* (2013.01); *H04L 67/04* (2013.01); *H04L 67/28* (2013.01); *H04L 67/2842* (2013.01); *H04L 67/2857* (2013.01); H04L 67/306 (2013.01); H04W 88/04 (2013.01)

(58) Field of Classification Search
CPC .... H04W 68/04; H04M 1/7253; H04L 67/04; H04L 67/2842; H04L 67/28; H04L 67/306; H04L 67/2857
USPC ............................ 455/418, 419, 414.1–414.3
See application file for complete search history.

(56) References Cited

U.S. PATENT DOCUMENTS

| 6,954,790 B2 | 10/2005 | Forslöw ..................... 709/227 |
| 2002/0147771 A1 | 10/2002 | Traversat et al. ............. 709/203 |
| 2005/0003804 A1* | 1/2005 | Huomo et al. ............. 455/414.1 |

(Continued)

FOREIGN PATENT DOCUMENTS

| WO | WO 01/35211 A2 | 5/2001 |
| WO | WO 01/35211 A3 | 5/2001 |

(Continued)

OTHER PUBLICATIONS

M. Rangan et al., "Contextual replication for mobile users," *Mobile Business*, Jul. 11-13, 2005, Abstract 1 pg, http://ieeexplore.ieee.org/xpl/freeabs_all.jsp?arnumber=1493647.

(Continued)

*Primary Examiner* — Wayne Cai
(74) *Attorney, Agent, or Firm* — Judy Yee; Steve Wight; Micky Minhas

(57) ABSTRACT

Previously cached data that includes contextual information is transferred between wireless devices. A first wireless device that is highly mobile is arranged to receive data from an external data source for storage on the first wireless device. The first wireless device subsequently travels to another locale where a second wireless device is located. After the wireless devices discover one another, cached data is transferred from the first wireless device to the second wireless device such that the cached data is replicated including contextual information. Each wireless device is configured to process data according to a set of acquisition rules and/or user preferences so that the cached data is managed according context. The cached data is effectively replicated by the wireless devices such that the cached data originating from the external data source is made available to wireless devices that are otherwise unable to retrieve data from the external data source.

18 Claims, 8 Drawing Sheets

(56) References Cited

U.S. PATENT DOCUMENTS

| | | |
|---|---|---|
| 2005/0004804 A1 | 1/2005 | English .......................... 705/1 |
| 2005/0148356 A1 | 7/2005 | Ferguson ..................... 455/502 |
| 2005/0289551 A1* | 12/2005 | Wojtkiewicz et al. ........ 718/103 |
| 2006/0083221 A1 | 4/2006 | Yanai et al. .................. 370/352 |
| 2006/0153357 A1 | 7/2006 | Acharya et al. .......... 379/266.01 |
| 2006/0173936 A1 | 8/2006 | Castro et al. ................. 707/205 |
| 2007/0110010 A1* | 5/2007 | Kotola et al. ................. 370/338 |
| 2007/0277202 A1* | 11/2007 | Lin et al. ......................... 725/46 |
| 2009/0163189 A1* | 6/2009 | Gil et al. ................... 455/414.3 |

FOREIGN PATENT DOCUMENTS

| | | |
|---|---|---|
| WO | WO 02/17567 A2 | 2/2002 |
| WO | WO 2005/094108 A1 | 10/2005 |
| WO | WO 2005/120011 A1 | 12/2005 |

OTHER PUBLICATIONS

Dave Ratner, "Roam: A Replication System for Mobile Environments," 3 pgs. http://www.lasr.cs.ucla.edu/roam98/NewRoamWelcome.html.

Amy L. Murphy et al., Using LIME to Support Replication for Availability in Mobile Ad Hoc Networks, 18 pgs http://www.lasr.cs.ucla.edu/roam98/NewRoamWelcome.html, last viewed Jan. 12, 2007.

* cited by examiner

CONTEXTUAL AUTO-REPLICATION IN SHORT RANGE WIRELESS NETWORKS

BACKGROUND OF THE INVENTION

As society becomes increasingly mobile, mobile computing devices are enjoying a tidal wave of popularity and growth. Cell phones, wireless PDAs, wireless laptops and other mobile communication devices are making impressive inroads with mainstream customers. Growth is constrained in part by a lack of truly adequate high-coverage-areas, as well as a lack of availability for inexpensive, small, battery-efficient wireless communication devices. Dead spots in the cellular telephone networks often exist inside buildings as well as outside of buildings, where large physical obstructions may interfere with signal reception.

Urban city environments have enjoyed growth in the use of wireless networking devices. Laptop computers and other portable devices are often capable of wireless Ethernet connections such as that specified by the IEEE 802.x standards. However, even within city environments there are locales that do not have adequate wireless networking coverage to maintain consistent network access.

SUMMARY OF THE INVENTION

The present invention is generally related to a highly mobile wireless device that retrieves contextual data from an external data source, and subsequently communicates the contextual data to a wireless mobile device that is outside of the range of the external data source.

Generally, a first wireless device that is highly mobile is arranged to receive data from an external data source for storage on the first wireless device. The first wireless device subsequently travels to another locale where a second wireless device is located. After the wireless devices discover one another, cached data is transferred from the first wireless device to the second wireless device such that the cached data is replicated including contextual information. Each wireless device is configured to process data according to a set of acquisition rules and/or user preferences so that the cached data is managed according context. The cached data is effectively replicated by the wireless devices such that the cached data originating from the data source is made available to wireless devices that are otherwise unable to retrieve data from the data source.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

Figure 1:
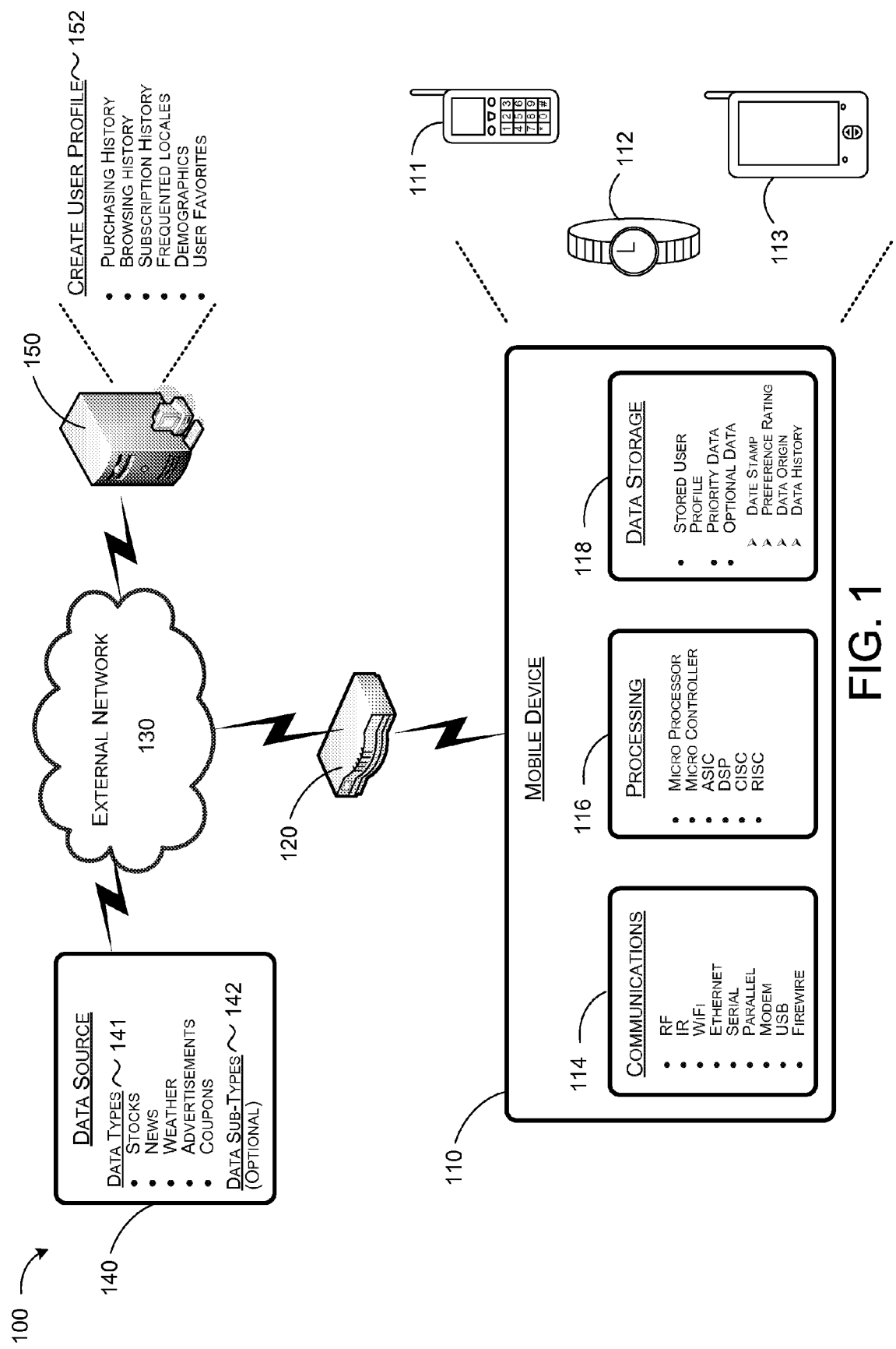
FIG. 1 illustrates an example operating environment for a mobile device that interfaces with a data source for contextual auto-replication.

Embodiments of the present invention will be described in detail with reference to the drawings, where like reference numerals represent like parts and assemblies throughout the several views. Reference to various embodiments does not limit the scope of the invention, which is limited only by the scope of the claims attached hereto. The examples set forth in this specification are not intended to be limiting and merely set forth some of the many possible embodiments for the claimed invention.

The present disclosure is related to a system, method and apparatus for transferring cached data that includes contextual information between wireless devices. A first wireless device that is highly mobile is arranged to receive data from an external data source for storage on the first wireless device. The first wireless device subsequently travels to another locale where a second wireless device is located. After the wireless devices discover one another, cached data is transferred from the first wireless device to the second wireless device such that the cached data is replicated including contextual information. Each wireless device is configured to process data according to a set of acquisition rules and/or user preferences so that the cached data is managed according context. The cached data is effectively replicated by the wireless devices such that the cached data originating from the external data source is made available to wireless devices that are otherwise unable to retrieve data from the external data source.

Local area networks (LANs) and wide area networks (WANs) often have limited wired access points into their networks. Although wireless access points have become increasingly more popular in modern times, such wireless networks have limited range. In many situations, the cost of deploying a wide area wireless network is impractical due to costs and maintenance issues. High speed data connectivity may also be available through cellular telephone networks or satellite data transmission. However, the use of cellular and satellite networks for high speed data connectivity may also be cost prohibitive. Moreover, the physical movements of persons with mobile devices leads to many situations where people and their devices are not in range of data networks. The present disclosure contemplates these above describes situations to identify a system, method and apparatus for replicating data that is retrieved from a data source by one mobile device to another mobile device that is unable to connect to the data source.

Contextual auto-replication over short range wireless networks allows for the virtual extension of network coverage to extend beyond the physical coverage range. In one example a mobile device that enjoys wireless networking coverage receives currently up-to-date data and subsequently is physically transported with the user to an area that does not have wireless networking coverage. The mobile device automatically replicates the currently up-to-date data to all devices that are within the mobile devices range. The transferred data is contextual to the particular location and in some cases it is contextual to various user profile characteristics. Examples data types include, but are not limited to weather data, stocks data, search query data, electronic coupons and/or advertisements.

Illustrative Operating Environment

FIG. 1 illustrates an example operating environment (100) for a mobile device (110) that interfaces with a data source (140) for contextual auto-replication.

The mobile device (110) is arranged to communicate with an external network (130) through a network access point (120), which can be a wired access point or a wireless access point. The data source (140) is also in communication with the external network (130). A computing device such as a server computer (150) is arranged to manage network communications for the external network (130) so that data from the data source (140) can be transferred to the mobile device (110). The data from the data source can be categorized into data types (141) such as for example, stocks, news, weather, advertisements, and electronic coupons. In some examples, the data types (141) can be refined into further categories such as data sub-types (142). Each of the data types (141) and/or data sub-types (142) can be associated with a service (e.g., stock quotes) such as might be activated via a user subscription.

The server computer (150) is arranged to process various inputs to create a user profile that is associated with the mobile device (110). The user profile (152) can be created using a web-interface during a subscription to one or more services such as a product registration associated with the mobile device. In some examples, the user profile is manually configured by the user of the mobile device (110) by selection of subscriptions and user favorites. In other examples, the user profile is automatically managed based on historical data associated with the user of the mobile device such as by monitoring purchasing and web-browsing histories, or by tracking locales that are frequented by the mobile device user. Additional statistical analysis and demographics information can also be used to refine the user profile. Once a user profile is created, the user profile is stored in the mobile device (110) so that various policies can be enforced for acquisition and filtering of data.

The mobile device (110) can be in any variety of form factors such as for example a cellular telephone style device (111), a watch style device (112), or a personal data assistant (PDA) style device (113). The mobile device includes functional blocks for communications (114), processing (116), and data storage (118). In operation, the communications block (114) is arranged to facilitate communications between the access point (120) and the data source (140) via the external network (130). The communications block (114) also facilitates communications to other mobile devices as will be described later. The processing block (116) is arranged to manage data processing, and also manage interfaces with the communications block (114) and the data storage block (118). The data storage block (118) includes functions for the storage and retrieval of information such as a user profile, priority data, and other optional data including any relevant data tracking information such as date stamping, origin of the data, data usage history, and preference ratings associated with the data.

The communications block (114) can include interfaces in software and/or hardware for both wired and wireless communications. Example wireless communications interfaces include, but are not limited to a radio frequency (RF) interface, an infra-red (IR) interface, and a wireless fidelity (WiFi) interface such as specified by the IEEE 802.x standards. Example wired communications interfaces include, but are not limited to an Ethernet interface, a serial interface, a parallel interface, a universal serial bus (USB) interface, a Firewire interface (e.g., IEEE 1394) and a modem interface. In some examples configurations various software functions for the communications block (114) are handled by the processing block (116), while in other example configurations all of the software functions managed by the communications block (114) itself.

The processing block (116) can be implemented by any combination of software and/or hardware that is appropriately configured for managing functions for the mobile device (110). An example hardware implementation of the processing block (116) includes any variety of processing device including, but not limited to, a micro-processor, a micro-controller, an application specific integrated circuit (ASIC), a digital signal processor (DSP), a complex instruction set computer (CISC) processor, and/or a reduced instruction set computer (RISC) processor. The processing block (116) may include various data management capabilities such as encryption, decryption, encoding, decoding, compression, and decompression. The processing block (116) can further provide bookkeeping functions such as tracking the age and usage of data, prioritizing data based on user preferences and relevance ratings, deleting data from the storage based various criteria such as age, usage, and priority. In some examples configurations various software functions for the processing block (114) are stored by the data storage block (118), while in other example configurations all of the software functions managed by the processing block (116) itself.

The data storage block (118) can be implemented by any combination of software and/or hardware that is appropriately configured to manage storage and retrieval of data. In some instances various software functions for the processing block (116) or the communications block (114) may also be stored with the data storage block (118). The hardware used for data storage and retrieval includes memory devices that are suitable for use in a mobile electronics such as, for example, any variety of random access memory, weather dynamic or static, read-only memory (ROM), and non-volatile memories such as flash memory. The hardware used for data storage may also be implemented as a non-memory based storage device such as, for example, a hard disk drive (HDD) or an optical disk drive. Additional examples of data storage will be discussed later with regards to FIG. 3.

Figure 2:
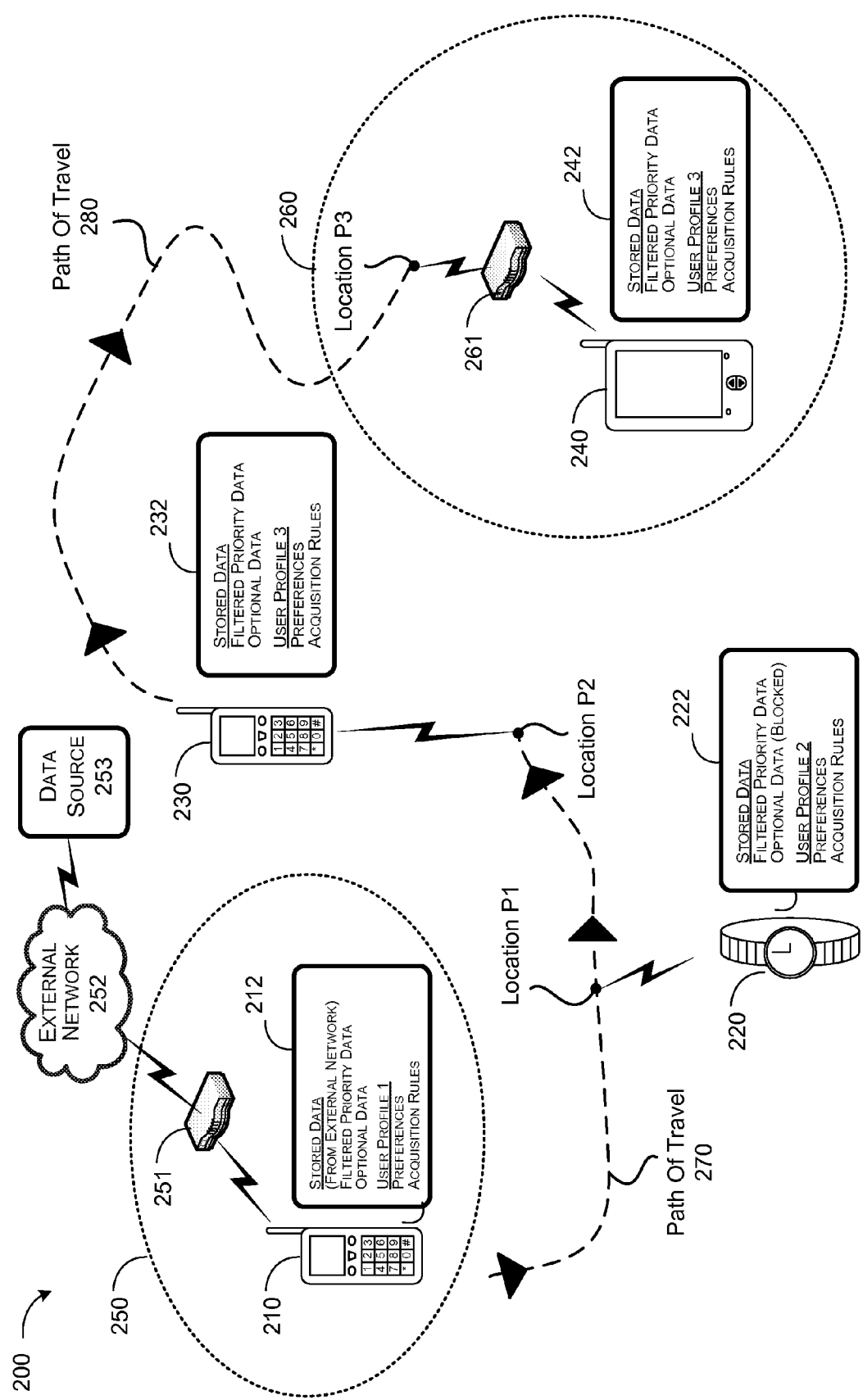
FIG. 2 illustrates an example operating environment for a mobile device that auto-replicates with other mobile devices.

FIG. 2 illustrates an example operating environment (200) for a mobile device (210) that auto-replicates with other mobile devices (220, 230 and 240). Each of the mobile devices (210, 220, 230 and 240) is arranged in accordance with that described previously with respect to FIG. 1. A separate user profile is stored in the data storage block (212, 222, 232 and 242) for each mobile device, where each user profile includes a different set of preferences and acquisition rules that are specific to the mobile device user.

Initially a first mobile device (210) is within range (250) to communicate with an external network (252) via an access point (251) to retrieve data from a data source (253). The communication of the first mobile device (210) with the external network (252) can be accomplished through a wired or wireless connection. During this communication, the first mobile device (210) retrieves and stored data from the data source (253) in its data storage block (212), where the data from the data source is filtered according to the user preferences and acquisition rules for the first mobile device (210). The data may optionally be prioritized by the first mobile device (110) according to its user preferences, date stamped, and marked as originating from the external data source (253). According to the user's profile, the received data is prioritized according to those data items that are most contextually interesting to the user. For example, the user may receive data that corresponds to a coupon for $1 off the purchase of coffee at a particular coffee shop that the user is known to frequent. Other data that is less contextually interesting may also be stored on the user's device such as a notice of a sale on size 10-13 shoes at a particular retail shop that the user has never visited.

The first mobile device (210) subsequently travels outside the range (250) of the access point (251) along the path of travel (270). At location P1, the first mobile device (210) discovers a second mobile device (220) through wireless communications, where the second mobile device (220) is outside the range of an external data source (e.g., data source 253). The second mobile device (220) recognizes the first mobile device (210) as an external data source, and receives a transmission from the first mobile device (210) that includes a cached copy of the data originally retrieved from the external data source (220). The second mobile device (220) applies its own user profile settings to the received data, where the received data is prioritized so that high priority data is stored, and other optional data can be blocked. An example of high priority data may include a subscription to a particular newswire such as stocks, weather, etc. The optional data can be other data including coupons, advertisements, or other subscription related data for which the user of the second mobile device (220) does not subscribe. In one example, the optional data is blocked out by the second mobile device (220) when insufficient storage space is available. In another example the optional data is blocked out by the second mobile device (220) according to an acquisition policy certain varieties of data from being received (e.g., no advertisements permitted, parental control ratings, etc.).

The first mobile device (210) subsequently travels from location P1 to location P2, which is outside the range of external data sources. At location P2, the first mobile device (210) discovers a third mobile device (230) through wireless communications. The third mobile device (220) recognizes the first mobile device (210) as an external data source, and receives a transmission from the first mobile device (210) that includes a cached copy of the data originally retrieved from the external data source (220). The third mobile device (220) applies its own user profile settings to the received data, where the received data is prioritized so that high priority data is stored, and other optional data can be blocked. In this example, the acquisition rules for the third mobile device (220) do not block the optional data, and sufficient data storage is available for complete storage of the cached data from the external data source.

The third mobile device (230) subsequently travels from location P2 to location P3, which is also outside the range of external data sources. At location P3, the third mobile device (230) is within a range (260) of a wireless network access point (261), which is also in range of other mobile device (240) or non-mobile device (not shown). The third mobile device (230) acts as an external data source to all devices that are accessible by the wireless access point (261). For example, the fourth mobile device (240) applies its own user profile settings to acquire data from the third mobile device (230) via the wireless access point (261). Even though the third mobile device (230) has never been in range (250) of the external network (252) that accesses the external data source (253), the third mobile device (230) replicates the data previously cached by the first mobile device and carries the data therein for discovery in other downstream device and networks.

Data that is being carried by the mobile devices have a designated context that is useful for filtering received data. For example, one of the mobile devices may be carrying an electronic coupon for a particular store that is never encountered. The electronic coupon may be filtered from the user's view on the mobile device unless the particular store locale is reached during travel. The coupon can be passed to other mobile devices using the auto replication topology described herein. Although many of the mobile devices may never encounter the particular store, a downstream mobile device that receives the replicated coupon may discover a locale near the store and the user interface for that downstream mobile device may present the coupon to the user at that time.

Illustrative Computing Device

Figure 3:
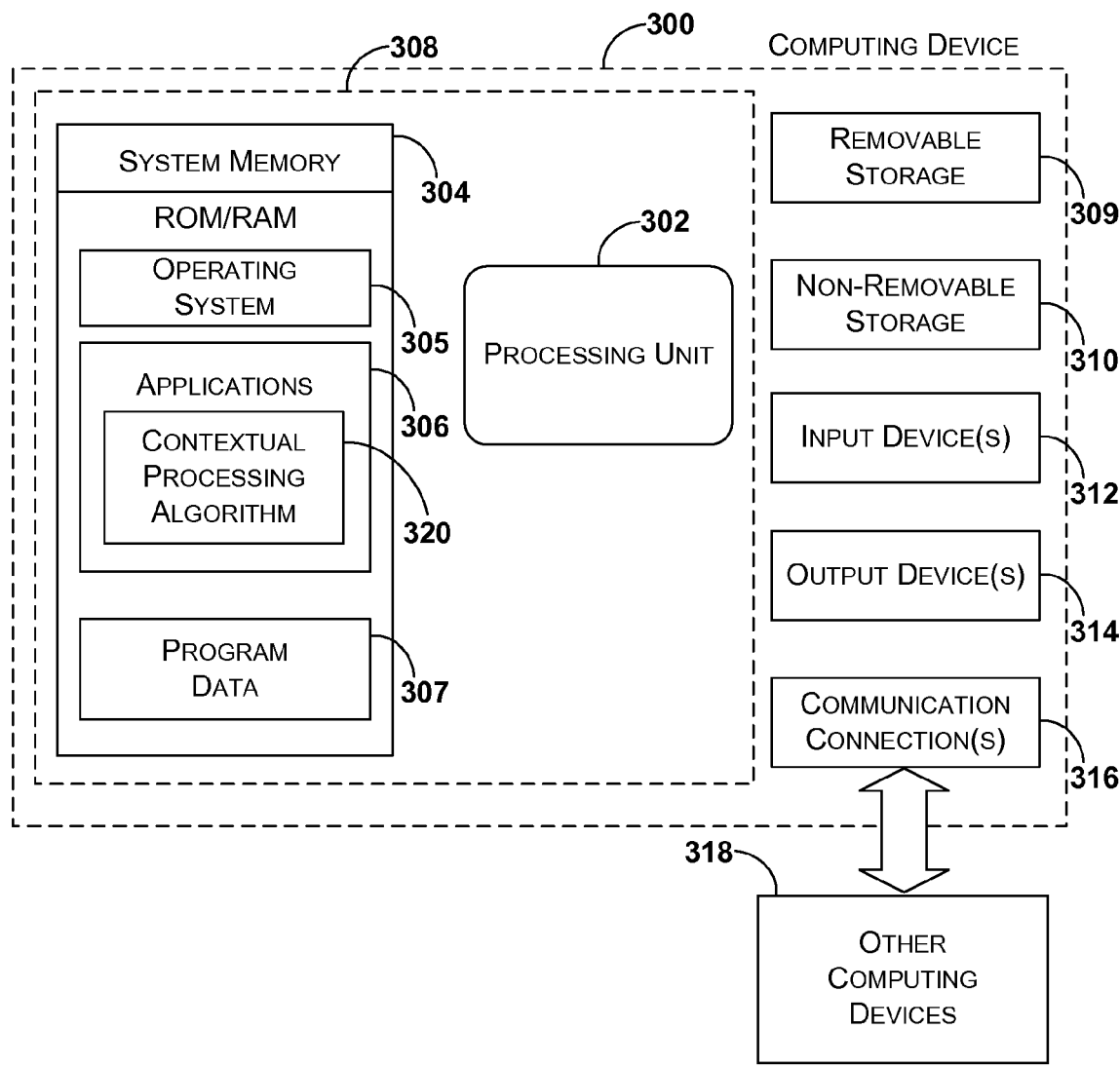
FIG. 3 is a diagram illustrating an example computing device that is configured for contextual auto-replication with mobile devices.

FIG. 3 is a diagram illustrating an example computing device (300) that is configured for contextual auto-replication with mobile devices. In a very basic configuration, computing device 300 typically includes at least one processing unit 302 and system memory 304. Depending on the exact configuration and type of computing device, system memory 304 may be volatile (such as RAM), non-volatile (such as ROM, flash memory, etc.) or some combination of the two. System memory 304 typically includes an operating system 305, one or more applications 306, and may include program data 307. Application 306 includes a contextual processing algorithm that is arranged to process data according to user profile settings (e.g., user preferences, acquisition rules, etc) to filter and process data for storage and retrieval based on a context associated with the data. In one embodiment, application 306 further includes a user interface, an email application program, a contact manager program, a database program, a file system service, or some other service, process or program 320. This basic configuration is illustrated in FIG. 3 by those components within dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by removable storage 309 and non-removable storage 310. Computer storage media may include volatile and nonvolatile, removable and non-removable media implemented in any method or technology for storage of information, such as computer readable instructions, data structures, program modules, or other data. System memory 304, removable storage 309 and non-removable storage 310 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 300. Any such computer storage media may be part of device 300. Computing device 300 may also have input device(s) 312 such as keyboard, mouse, pen, voice input device, touch input device, etc. Output device(s) 314 such as a display, speakers, printer, etc. may also be included.

Computing device 300 also contain communication connections 316 that allow the device to communicate with other computing devices 318, such as over a network. Communication connection 316 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared (IR) and other wireless media. The term computer readable media as used herein includes both storage media and communication media.

Computing device 300 can be implemented as a portion of a small-form factor portable electronic device such as a cell phone, a personal data assistant (PDA), a personal media player device, a wireless web-watch device, or a hybrid devices that include any of the above functions. Computing device 300 can also be implemented as a personal computer including both laptop computer and non-laptop computer configurations.

Example Process Flows

FIGS. 4-8 are diagrams illustrating various process flows (400, 500, 600, 700 and 800) for contextual auto-replication of data from a data source with mobile devices.

Figure 4:
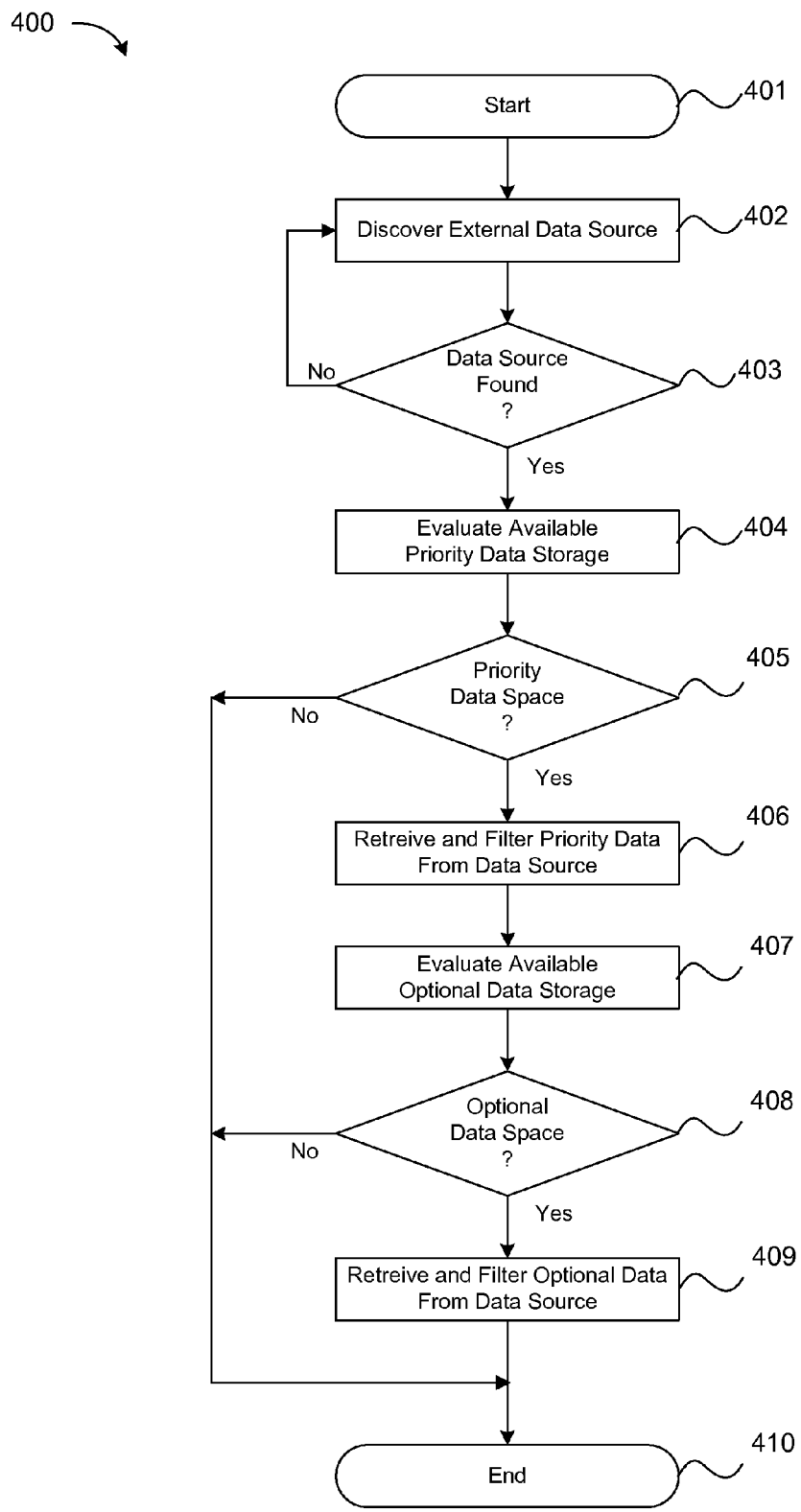
FIGS. 4-8 are diagrams illustrating various process flows for contextual auto-replication of data from a data source with mobile devices.

Processing begins at block 401 in FIG. 4, and proceeds to block 402 where a mobile device attempts locate an external data source. Continuing to decision block 403, the mobile device determines whether or not an external data source has been discovered. Processing returns to block 402 when no external data source is located. Otherwise processing flows from decision block 403 to block 404 when an external data source is located. At block 404 the mobile device evaluates the available data storage space for high priority data. Processing continues at decision block 405, which determines weather or not priority data space is available for data storage. Processing terminates at block 410 when no priority data space is available. Otherwise processing flows from decision block 405 to block 406 when priority data space is available. At block 406, data is retrieved from the external data source and filtered to identify the highest priority data according to the user profile settings of the mobile device. The filtered high priority data is then stored in the mobile device's data storage including all of the relevant contextual information. Optionally, the highest priority data is marked with a date stamp and logged with a data source identifier that identifies the particular external data source as the originator of the data. Continuing to block 407, the mobile device evaluates the available data storage space for optional data. Processing continues at decision block 408, which determines weather or not optional data space is available for data storage. Processing terminates at block 410 when no optional data space is available. Otherwise processing flows from decision block 408 to block 409 when optional data space is available. At block 409, optional data is retrieved from the external data source and filtered according to the user profile settings of the mobile device. The filtered optional data is then stored in the mobile device's data storage including all of the relevant contextual information. The optional data may also be marked with a date stamp and logged with a data source identifier that identifies the particular external data source as the originator of the data.

Figure 5:
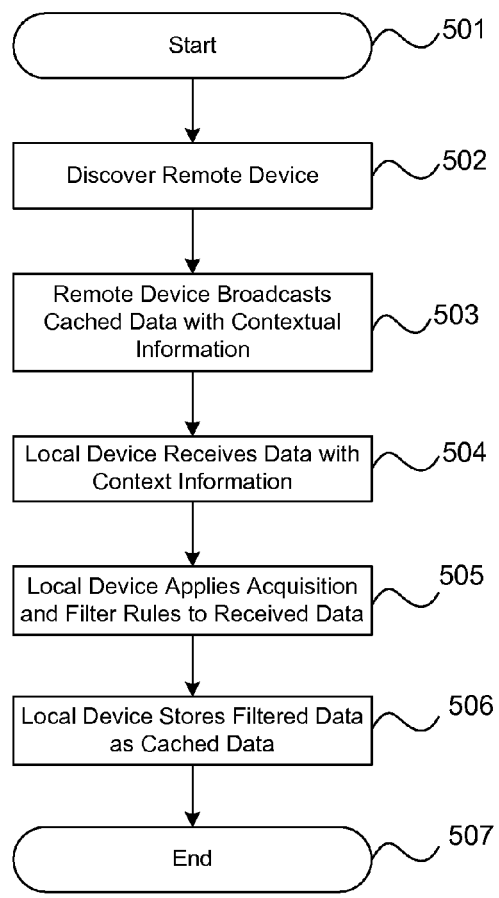

For FIG. 5, processing begins at block 501 and continues to block 502 where the local mobile device discovers a remote device (e.g., another mobile device that acts as a data source). Continuing to block 503, the remote device broadcasts data including contextual information to the local mobile device. At block 504 the local device receives the data with the contextual information. The broadcasted data from the remote device corresponds to data that was previously retrieved from an external data source that is not accessible by the mobile device, where the data was previously cached by the remote device. At block 505, the local mobile device applies acquisition and filtering rules to the received data in accordance with the user profile associated with the local mobile device. Continuing to block 505, the local device stores the filtered data as cached data. Processing for FIG. 5 terminates at block 507.

Figure 6:
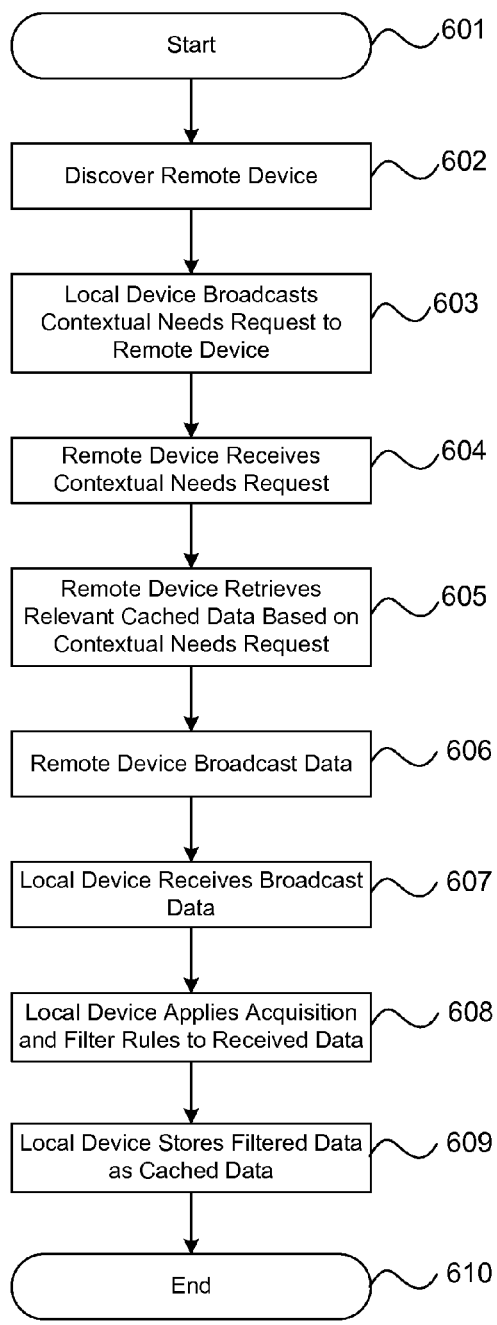

For FIG. 6, processing begins at block 601 and continues to block 602 where the local mobile device discovers a remote device (e.g., another mobile device that acts as a data source). Continuing to block 603, the local mobile device broadcasts a request to the remote device that identifies contextually based needs (e.g., subscription details, user preferences, user favorites, etc.). At block 604, the remote device receives the contextual needs request. Continuing to block 605, the remote device retrieves the most relevant data from its cache that matches the needs request. At block 606 the remote device broadcasts the retrieved data to the local device, which receives the broadcasted data with the contextual information at block 607. At block 608, the local mobile device applies acquisition and filtering rules to the received data in accordance with the user profile associated with the local mobile device. Continuing to block 609, the local device stores the filtered data as cached data. Processing for FIG. 6 terminates at block 610.

Figure 7:
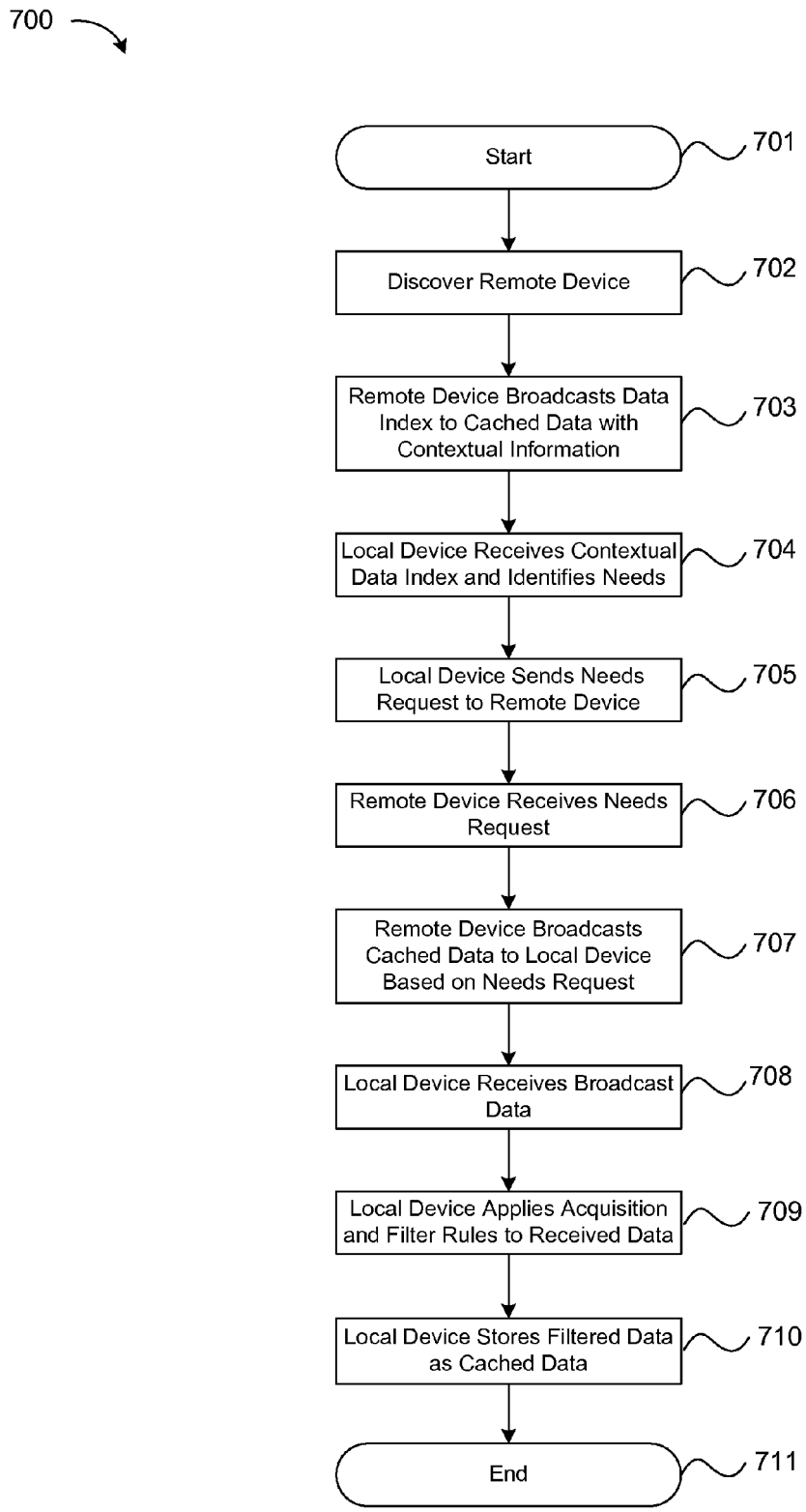

For FIG. 7, processing begins at block 701 and continues to block 702 where the local device (e.g., a mobile device) discovers a remote device (e.g., another mobile device that acts as a data source). Continuing to block 703, the remote device broadcasts a data index including contextual information about the data that is currently cached on the remote device. Continuing to block 704, the local device receives the data index with contextual information and identifies needs based on the user profile associated with the local mobile device. The identified needs correspond to those data elements on the remote device that match most closely to the desired contextual settings associated with the user profile for the local mobile device. At block 705, the local device sends the needs request to the remote device, identifying specific data according to the previously received index. At block 706 the remote device receives the needs request, and retrieves the identified data with contextual information. At block 707 the remote device retrieves the cached data identified with the needs request, and broadcasts the retrieved data to the local device. The local device receives the broadcasted data at block 708, with the contextual information. At block 709, the local device applies acquisition and filtering rules to the received data in accordance with the user profile associated with the local device. Continuing to block 710, the local device stores the filtered data as cached data. Processing for FIG. 7 terminates at block 711.

Figure 8:
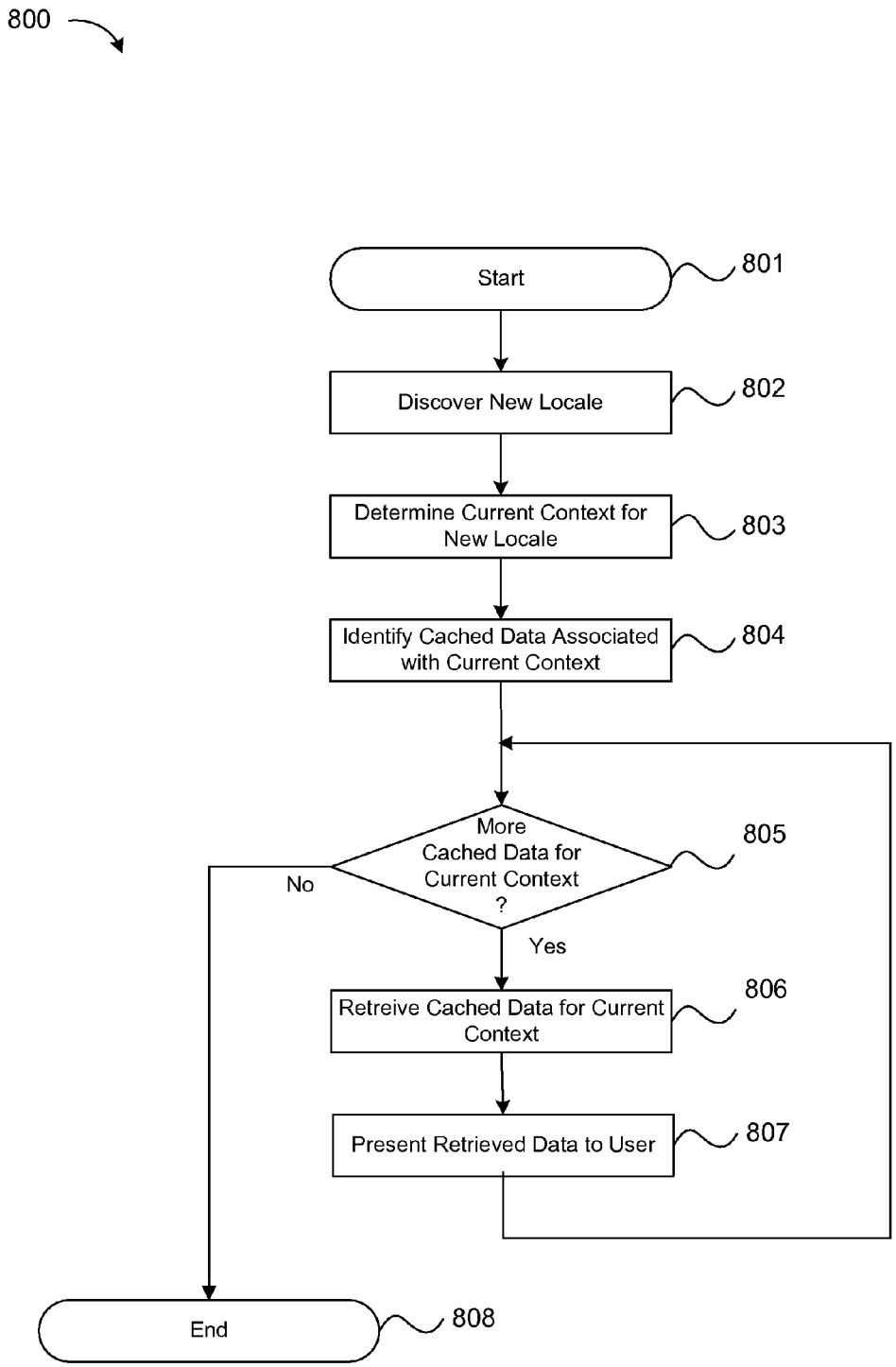

For FIG. 8, processing begins at block 801 and continues to block 802 where the mobile device discovers a new locale through wireless communications (e.g., the mobile device detects a WiFi hotspot or some other public wireless communication connection that identifies a particular geographical location. Continuing to block 803, the mobile device determines a current context for the new locale. Continuing to block 804, the mobile device evaluates cached data in the mobile device to identify cached data that matches the current context of the new locale. At decision block 805, the mobile device determines if more data is cached that has the current context. Processing continues from block 805 to block 808 where processing terminates when no additional data cached on the mobile device matches the current context for the locale. Otherwise processing continues from decision block 805 to block 806, where stored data is retrieved for the current context. At block 807, the retrieved data is presented to the user of the mobile device for review (e.g., an electronic coupon, advertisement or notice is presented on the display). Processing returns to decision block 805 from block 807.

Optionally, the cached data can be evaluated to identify a relevance or priority level associated with the current locale, the user profile, or algorithmically based on statistical analysis. In one example, a user profile may have a preference for coffee from a particular coffee shop. Cached data may include contextual information for an electronic coupon at the particular coffee shop, where the remaining data corresponds to an electronic coupon. When the user enters a locale where the particular coffee shop is located, the relevance for that previously stored electronic coupon is very high. The mobile device can be configured to detect the locale based on a WiFi hotpot that is located near or on the premises of the coffee shop. In this instance, the contextual information is evaluated as highly relevant since the contextual information for the cached data matches the context of the current locale and/or other user preferences. The priority level for relevant cached data can be adjusted based on statistical models and/or user preferences, and the highest priority relevant cached data can be presented to the user such as though a graphics display.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A mobile device for auto-replicating data with contextual information that is received from an external data source to a wireless device, the mobile device comprising:
    a communications block arranged to facilitate communications between the mobile device and the external data source, and also arranged to facilitate wireless communications with the wireless device;
    a data storage block arranged for storing a user profile associated with the mobile device, and also arranged for storing and retrieving data received from the external data source, wherein the data received from the external data source includes contextual information, and wherein the data storage block comprises a cache and the contextual information includes location context information;
    a processing block arranged to manage data processing, and also arranged to manage interfaces associated with the communications block and the data storage block, wherein the communications block, the data storage block and the processing block are arranged in cooperation with one another for:
    receiving data with contextual information from the external data source;
    identifying a current context associated with the mobile device based on a user profile;
    filtering the received data from the external data source according to the current context associated with the mobile device to provide filtered data;
    prioritizing the received data to determine high priority data and optional data and to determine a portion of the received data to store in the data storage block;
    storing the filtered data with the contextual information in the data storage block when space is available in the data storage block;
    determining location information for a locale of the mobile device;
    evaluating the filtered data to identify a portion of the filtered data that includes location context information that matches the location information for the locale; and
    displaying the portion of the filtered data;
    discovering the wireless device, wherein the wireless device is outside a communications range to communicate with the external data source;
    generating an index of the cached data including the contextual information that is stored on the mobile device;
    sending the index of the cached data including the contextual information to the discovered wireless device;
    receiving a needs request from the discovered wireless device after transmitting the index of cached data;
    selecting a subset of the stored data on the mobile device based on the needs request from the wireless device; and
    broadcasting the subset of the stored data to the wireless device.

2. The mobile device of claim 1, wherein the communications block is arranged to facilitate communications via at least one of: a wired interface, a wireless interface, a serial interface, a parallel interface, an Ethernet interface, a universal serial bus (USB) interface, a Firewire interface, a modem interface, a Bluetooth interface, a radio frequency (RF) interface, an infra-red (IR) interface, and a wireless fidelity (WiFi) interface.

3. The mobile device of claim 1, wherein the user profile comprises either a user selected preference, an acquisition rule associated with the user of the mobile device, or a combination of the user selected preference and the acquisition rule associated with the user of the mobile device.

4. The mobile device of claim 1, wherein the user profile is generated by a combination of factors associated with the user including any one of: a purchasing history associated with the user, a browsing history associated with the user, a subscription history associated with the user, a frequented locale associated with the user, demographics associated with the user, and user selected favorites.

5. The mobile device of claim 1, wherein the mobile device is further arranged to identify the current context for the mobile device based upon the locale and the user profile.

6. The mobile device of claim 1, wherein the data with contextual information includes a data type, wherein the data type comprises at least one of stocks, news, weather, advertisements, and electronic coupons.

7. The mobile device of claim 1, wherein the mobile device is arranged for discovering the wireless device when the wireless device comprises one of: a wireless access point, a first computing device that is in communication with the mobile device via the wireless access point, a second computing device that includes a wireless fidelity (WiFi) interface for communicating with the mobile device, a third computing device that includes a Bluetooth interface for communicating with the mobile device, a fourth computing device that includes an infra-red (IR) interface for communicating with the mobile device, and a fifth computing device that includes a radio frequency (RF) interface for communicating with the mobile device.

8. The mobile device of claim 1, wherein the mobile device is further arranged for selecting all of the contextual information associated with the data storage block for the at least the portion of the stored data based.

9. A computer implemented method for auto-replicating data with contextual information that is received from an external data source with a highly mobile wireless device, the method comprising:
    evaluating a user profile associated with the highly mobile wireless device;
    discovering the external data source with a wireless communication interface in the highly mobile wireless device;
    evaluating available data storage space in a data storage block of the highly mobile wireless device, wherein evaluating data storage space further comprises separately evaluating data storage space for high priority data and optional data;
    receiving data with contextual information from the external data source via the wireless communications interface, wherein the data storage block comprises a cache and the contextual information includes location context information;

filtering the received data from the external data source according to either the user profile, the contextual information associated with the received data, or a combination of the user profile and the contextual information associated with the received data;

prioritizing the received data to determine high priority data and optional data and to determine a portion of the received data to store in the data storage block; wherein the optional data comprises received data that is not subscribed to by the highly mobile wireless device and advertisements;

storing the high priority filtered data with the contextual information in a high priority data storage block of the highly mobile wireless device when data storage space is available in the high priority data storage block, wherein at least a portion of the stored high priority filtered data is transmitted to another wireless device;

storing the optional filtered data with the contextual information in an optional priority data storage block of the highly mobile wireless device when data storage space is available in the optional priority data storage block, wherein at least a portion of the stored optional filtered data is transmitted to another wireless device;

determining location information for a locale of the mobile device;

evaluating the filtered data to identify a portion of the filtered data that includes location context information that matches the location information for the locale; and displaying the portion of the filtered data.

10. The computer implemented method of claim 9, wherein discovering the external data source further comprises identifying a wireless communication interface for the external data source, wherein the wireless communication interface comprises one of a Bluetooth interface, a radio frequency (RF) interface, an infra-red (IR) interface, and a wireless fidelity (WiFi) interface.

11. The computer implemented method of claim 9, wherein the user profile comprises either a user selected preference, an acquisition rule associated with the user of the highly mobile wireless device, or a combination of the user selected preference and the acquisition rule associated with the user of the highly mobile wireless device.

12. The computer implemented method of claim 9, further comprising discovering a locale associated with the highly mobile wireless device, determining a current context for the highly mobile wireless device based upon the locale, identifying cached data in the data storage block that has contextual information that matches the current context, and retrieving the cached data from the data storage block.

13. The computer implemented method of claim 12, further comprising assigning a priority level to the cached data based on the current context comparison, and presenting the cached data with the highest priority level to the user of the highly mobile wireless device.

14. The computer implemented method of claim 9, wherein the external data source corresponds to another wireless device that is arranged to communicate data with contextual information to the highly mobile wireless device.

15. A computer-readable storage medium on a memory device for storing a set of computer-executable instructions implementing a method for auto-replicating data with contextual information that is received from an external data source to a highly mobile wireless device that propagates the data with contextual information to a remote wireless device, the method comprising:

discovering the external data source with a communications interface in the highly mobile wireless device;

evaluating available data storage space in the highly mobile wireless device, wherein the data storage space comprises a cache;

receiving the data with contextual information from the external data source, wherein the contextual information includes location context information;

prioritizing the received data to determine high priority data and optional data and to determine a portion of the received data to store;

storing the high priority retrieved data with the contextual information in a high priority data storage space of the highly mobile wireless device when data storage space is available;

determining location information for a locale of the mobile device;

evaluating cached data from the data storage space to identify a portion of the retrieved cached data that includes location context information that matches the location information for the locale; and displaying the portion of the retrieved cache data;

storing the optional retrieved data with the contextual information in an optional priority data storage space of the highly mobile wireless device when data storage space is available in the optional priority data storage block;

discovering the remote wireless device with the communications interface in the highly mobile device;

retrieving cached data with contextual information from the data storage space of the highly mobile device when the remote wireless device is discovered; and transmitting retrieved cached data with contextual information via the communications interface to the remote wireless device such that the contextual information is auto-replicated from the highly mobile device to the remote wireless device.

16. The computer-readable storage medium for storing a set of computer-executable instructions implementing the method of claim 15, further comprising determining that the data storage space is full in the highly mobile wireless device, evaluating a first age associated with data already stored in the data storage space, identifying a second age associated with the received data from the external data source, and discarding the received data when the data storage space is determined as fill and the second age is older than the first age.

17. The computer-readable storage medium for storing a set of computer-executable instructions implementing the method of claim 15, further comprising receiving a contextual needs request from the remote wireless device via the communications interface, and identifying relevant cached data for retrieval from the data storage space based on the received contextual needs request.

18. The computer-readable storage medium for storing a set of computer-executable instructions implementing the method of claim 15, further comprising generating an index to the cached data on the highly mobile wireless device, transmitting the index to the cached data to the remote wireless device via the communications interface, receiving a needs request from the remote wireless device via the communications interface, and identifying cached data with contextual information for retrieval from the data storage space based on the received needs request.

* * * * *